United States Patent [19]

Wu

[11] Patent Number: 4,874,419

[45] Date of Patent: Oct. 17, 1989

[54] SUBSTRATE FOR GROWING SHIITAKE MUSHROOMS

[75] Inventor: Lung-chi Wu, Napoleon, Ohio

[73] Assignee: Campbell Soup Company, Camden, N.J.

[21] Appl. No.: 298,319

[22] Filed: Jan. 17, 1989

Related U.S. Application Data

[63] Continuation of Ser. No. 750,152, Jul. 1, 1985, abandoned.

[51] Int. Cl.$^4$ .......................... C05F 11/08; C05F 9/04; C05F 11/02
[52] U.S. Cl. ................................................ 71/5; 71/9
[58] Field of Search .......................... 71/5, 8, 9, 11, 23

[56] References Cited

U.S. PATENT DOCUMENTS

| | | | |
|---|---|---|---|
| 3,996,038 | 12/1976 | Toth et al. | 71/5 |
| 4,127,965 | 12/1978 | Mee | 71/5 |
| 4,333,757 | 12/1982 | Kurtzman . | |
| 4,637,163 | 1/1987 | Pellinen et al. | 71/5 |

FOREIGN PATENT DOCUMENTS

53179/73 9/1974 Australia .

OTHER PUBLICATIONS

Wu, L. C. and Stahmann, M. A. (1975), "Fungal Protein," in *Papers from a Workshop on Unconventional Sources of Protein*, College of Agricultural and Life Sciences, University of Wisconsin, Madison, pp. 67–104.

Ito, T. (1978), "Cultivation of Lentinus Edodes," in *The Biology and Cultivation of Edible Mushrooms*, Academic Press, New York, pp. 461–473.

San Antonio, J. P. (1981), "Cultivation of the Shiitake Mushroom," Hort Science 16: 151–156.

Leatham, G. F. (1982), "Cultivation of Shiitake, the Japanese Forest Mushrooms, on Logs: a Potential Industry for the United States," Forest Products Journal 32: 29–35.

Farr, D. F. (1983), "Mushroom Industry: Diversification with Additional Species in the United States," Mycologia 75: 351–360.

Jong, S. C. (1983), "The Easy Way to Grow Shiitake Mushrooms," American Type Culture Collection Quarterly Newsletter 3(4): 4.

San Antonio, J. P. and Hanners, P. K. (1983), "Spawn Disk Inoculation of Logs to Produce Mushrooms," HortScience 18: 708–710.

Chang, S. T. and Miles, P. G. (1984), "A New Look at Cultivated Mushrooms," BioScience 34: 358–362.

Wu, L.-C. (1985), "Composting Technology," in *Developmental Biology of Higher Fungi*, Cambridge University Press, Cambridge, pp. 541–559.

*Primary Examiner*—Ferris H. Lander
*Attorney, Agent, or Firm*—Banner, Birch, McKie & Beckett

[57] ABSTRACT

A non-sterile, pasteurized nutrient substrate composition is disclosed suitable for growing shiitake mushrooms. Its composition and preparation are described. In addition, the use of the substrate composition is taught for the commercial, large-scale growth of shiitake mushrooms in trays or beds.

8 Claims, No Drawings

SUBSTRATE FOR GROWING SHIITAKE MUSHROOMS

This application is a continuation, of application Ser. No. 750,152, filed July 1, 1985 and now abandoned.

TECHNICAL FIELD

The present invention is directed to a method of making a composted substrate on which shiitake mushrooms, can be grown. The invention is further directed to a method of growing shiitake mushrooms which is suitable for commercial production.

BACKGROUND OF THE INVENTION

Forest mushrooms, or shiitake (*Lentinus edodes*), have been used both as food and medicine in Asia for hundreds of years. However, cultivation of shiitake has remained in a primitive state until very recently. Shiitake traditionally have been grown on tree trunks, some types of trees supporting more abundant growth than others. Growth of shiitake on trees typically requires between one and two years until the first crop of fruiting bodies is produced.

One method which has been found to expedite the growth of shiitake involves growing the mushrooms aseptically in plastic bags or in trays on sterilized substrate. Such substrates generally include saw dust, bagasse, straw, paper chips and the like, which are supplemented with nutrients such as starch, yeast, sugars and protein. Using this method, mushrooms can be harvested in as little as three to four months after inoculation.

Unfortunately, this aseptic growth method is ill suited to the established equipment and procedures employed by large scale, commercial growers of white mushrooms (Agaricus). White mushrooms are grown on a pasteurized, composted substrate in trays. Therefore, there is a need for a method of growing shiitake mushrooms which is compatible with the techniques and apparatus used by the industry.

The basic procedure for commercially growing mushrooms involves either bulk pasteurization of compost in highly insulated rooms called "tunnels," or pasteurization of compost in trays. Such compost is then impregnated with mushroom mycelia. This step is referred to as "spawning", and is generally performed in individual beds or trays to facilitate handling and to maximize space utilization. Alternatively, the spawning can be performed in bulk. The spawn-impregnated compost is then allowed to develop under controlled temperature and moisture conditions. When the compost is spawned in bulk, the trays are filled after the spawn has permeated the compost. Once the hyphae of the mushrooms have permeated the compost, conditions are altered to cause the mushrooms to fruit. In the case of white mushrooms, a thin layer of soil, sand or peat is placed on top of the bed. The process of covering the bed is referred to as "casing". In the case of shiitake, fruiting is stimulated by significantly reducing the temperature of the mushroom beds. After the first crop of fruit has been harvested, additional cycles of fruiting occur, referred to as "breaks" or "flushes", until the nutrients in the compost have been depleted.

It is an object of the invention to provide a substrate for growing shiitake mushrooms.

It is another object to provide a substrate for growing shiitake mushrooms which is compatible with the apparatus and techniques used by commercial mushroom growers.

It is yet another object to provide a substrate for growing shiitake mushrooms which allows a first harvest within two to four months of spawning.

It is still another object of the invention to provide a method for growing mushrooms which eliminates the need for aseptic growth conditions.

SUMMARY OF THE INVENTION

In accordance with the foregoing objects, a nutrient substrate composition is provided for growing shiitake mushrooms comprising A broad range of component ratios can be used when preparing a compost for growing shiitake. The vegetative waste component comprises the bulk of the compost mixture. In a preferred formulation, wheat straw is a major component, comprising from about 37–50% of the compost mixture on a dry weight basis; corn cobs can comprise from about 24–47% by weight; cottonseed meal can comprise from about 8–20% by weight. Mineral fertilizers will typically comprise from about 3% to about 12% by weight of the compost mixture. For example, in a preferred formulation gypsum is added to the compost mixture at between about 2 and 6% by weight; potash is added at about 0–3% by weight; and ammonium nitrate is added at about 0.5–3% by weight.

Other suitable vegetative waste materials and mineral fertilizers may be identified and substituted for those noted above on the basis of routine testing. Unless otherwise indicated, all percentages reported throughout the specification and claims are by weight.

The vegetative waste material and the mineral fertilizers are blended together to form a compost mixture which is chopped, wetted and assembled into piles for aerobic digestion. The mixture of the vegetative wastes and mineral fertilizers is wetted to a moisture content of between about 65 and 80%. Preferably, the moisture content is between 72 and 76% of the compost mixture.

The compost mixture is then aerobically digested at an ambient temperature range of between about 18° C. to 30° C. by endogenous microorganisms, that is microorganisms such as bacteria, typically Actinomycetes, and fungi which are naturally on the vegetative material. The mixture can be formed into piles which are mechanically mixed periodically (about every two to three days) to insure suitable conditions for aerobic digestion of the vegetative wastes. Such aerobic digestion (composting) continues for between about one and nine days. When aerobic digestion of the compost mixture is carried out for longer than about one week, the resulting yield of mushrooms grown on that compost is reduced. Therefore, it is preferred to allow aerobic digestion for between about 4 and 7 days.

After digestion, the compost mixture is pasteurized at a temperature of about 60° to about 65° C. for between about four to six hours. It is imporatnt, however, that the mixture not be sterilized. Pasteurization can be accomplished economically by use of live steam in an insulated space such as a compost tunnel. This step is aimed at eliminating organisms in the compost which would compete with the growing mushrooms for nutrients.

The compost mixture can then be partially cooled to an intermediate temperature, between the pasteurization temperature and ambient temperature. This temperature condition, herein termed mesothermic, is generally between about 45° and 55° C., preferably between about 49° and 54° C. Keeping the compost at such mesothermic conditions for between about three to five days allows for further degradation of the compost by endogenous, thermophillic organisms into usable nutrients. If the compost is previously sterilized such further degradation would not be possible in a reasonable time.

The compost can then be further cooled to ambient temperature, generally between about 18° and 30° C. Preferably, the temperature will be about 23° to 27° C. At these ambient temperatures, shiitake mushroom spawn can be mixed into the compost without harm. Grain spawn consisting of mycelia and their growth substrate of rye, wheat, barley or the like, is preferred as a form of mushroom spawn. The spawn is added to the compost at about 6 to 15% by dry weight.

The trays can be filled before or after mixing of the spawn with the compost. If desired, the spawn can be allowed to grow in bulk until the compost becomes thoroughly myceluim-impregnated before the trays are filled. The spawn and compost can be pressed into trays, and covered with a moisture barrier, such as plastic film or sheet, or glass plate. The moisture barrier is generally removed when fruiting begins, and the beds kept moist by application of a mist of water.

Using the described methodologies, a first harvest of shiitake mushrooms can be obtained within about two to four months. Subsequent breaks can be harvested every ten to fourteen days, approximately. Such a cycle will prevail for about eight to ten months, until the nutrient value of the substrate has been depleted. Applicant has found that the combinations of the compost formulation and the sequential composting procedure described above is ideally suited for producing a compost suitable for growing shiitake mushrooms. Quite unexpectedly, shiitake can be grown in high yield on the compost, which is not sterilized.

No light is required during the spawn-run. However, under cropping conditions, light is introduced. As recognized in the prior art, flourescent tubes delivering between about 300 and 650 lux are sufficient. As is also well known in the art, fruiting of the mushrooms can be stimulated by subjecting the mycelia to a "cold shock" treatment. Under cropping conditions the air temperature is preferably lowered to promote fruiting, to about 12° to 20° C. while the compost temperature is about 16° to 25° C.

An important feature of the present invention is that the direct addition of high grade or refined food sources such as starch, yeast, sugar and protein to the substrate is not required. Instead, the present invention relies upon the in situ production of such ingredients by endogenous microorganisms in the presence of the vegetative waste and mineral fertilizer mixture. Unexpectedly, the presence in the compost of endogenous thermophiles which survive the pasteurization treatment, provide further digestion of the substrate, and remain in the compost during spawning, do not adversely inhibit shiitake development and growth.

The compost of the present invention and the method for its preparation are particularly well suited to growing shiitake mushrooms commercially or on a larger scale. Such compost can be prepared and handled efficiently using equipment already used industrially for growing Agaricus or white mushrooms.

The following working examples are not intended to limit the scope of the invention, but merely to exemplify concretely the methods to be employed and results which can be expected when the present invention is used.

EXAMPLE 1

The following components were added together in the listed proportions, mixed and thoroughly wetted to about 75% moisture content to prepare the compost of the present invention.

|  | % dry weight |
| --- | --- |
| Wheat straw | 38.1 |
| Corn cobs | 46.6 |
| Cottonseed meal | 8.5 |
| Ammonium nitrate | 1.4 |
| Potash | 1.4 |
| Gypsum | 4.0 |

To facilitate aerobic digestion, the pile was turned and ricked 2–3 times during the period of 7 to 9 days prior to pasteurization. Live steam was used to raise the air temperature to 60°–65° C. for 4–6 hours and thereby pasteurize the compost. The air temperature was slowly reduced to between 49° and 54° C. for 3 to 5 days to permit further digestion of the compost by endogenous thermophiles. The compost was then cooled further to 24° C. over 2 to 3 days, at which time it was ready for spawing.

EXAMPLE 2

Various strains of shiitake mushrooms, all of which are available from the Department of Plant Pathology, Pennsylvania State University, were grown on the compost prepared according to Example 1.

Mushrooms were harvested over a period of 8 months after spawing and weighed. Conversion efficiencies are expressed as $$\frac{\text{Wet weight of mushrooms}}{\text{Dry weight of compost}} \times 100$$

The time required to achieve first harvest from spawing was also determined. The results are summarized below.

| Shiitake Strain | Days to 1st Harvest | Yield (kg/m$^2$) | Conversion Efficiency (%) |
| --- | --- | --- | --- |
| WC-379 | 111 | 7.7 | 45 |
| WC-325 | 107 | 3.1 | 18 |
| WC-318 | 196 | 0.2 | 1 |
| WC-305 | 160 | 0.9 | 5 |

While the present invention has been described with respect to preferred embodiments, it should be understood that various changes may be made without departing from the spirit and scope of the invention as particularly claimed below.

What is claimed is:

1. A process for preparing a nutrient substrate composition suitable for growth of shiitake mushrooms consisting essentially of
   preparing a nitrogen-containing compost mixture consisting essentially of a vegetative waste, a mineral fertilizer and water, said mixture having a moisture content of about 65° to 80%;
   aerobically digesting the mixture at an ambient temperature range of between about 18° C. to 30° C. for between about 1 to 9 days;

pasteurizing the aerobically digested mixture; and further digesting the pasteurized mixture at a mesothermic temperature of between about 45° to 55° C. for between about 3 to 5 days.

2. A non-sterile, pasteurized, nitrogen containing, nutrient substrate composition suitable for growing shiitake mushrooms produced by the process of claim 1.

3. The composition of claim 2 wherein the vegetative waste consists essentially of cellulosic and ligning-containing materials and the mineral fertilizer comprises sources of potassium, calcium and nitrogen.

4. The composition of claim 3 wherein the mineral fertilizer is selected from the group consisting of potash, gypsum, ammonium nitrate and mixtures thereof.

5. The composition of claim 3 wherein the cellulosic and lignin-containing materials are selected from the group consisting of cereal straw, cottonseed meal, corn cobs and mixtures thereof.

6. The process of claim 1 wherein the pasteurization is performed at a temperature of about 60° to 65° C. for a period of about four to six hours.

7. The process of claim 1 wherein the mixture is aerobically digested at ambient temperature for about four to seven days.

8. A non-sterile, pasteurized, nitrogen-containing nutrient substrate composition produced by the process of claim 5 suitable for growing shiitake mushrooms consisting essentially of on a dry weight basis a mixture of 37–50% wheat straw, 24–47% corn cobs, 8–20% cottonseed meal, 2–6% gypsum, 0–3% potash and 0.5–3% ammonium nitrate.

* * * * *